(12) United States Patent
Yata et al.

(10) Patent No.: US 9,213,196 B2
(45) Date of Patent: Dec. 15, 2015

(54) DISPLAY AND ELECTRONIC UNIT

(75) Inventors: Tatsuya Yata, Gifu (JP); Masashi Mitsui, Miyagi (JP); Yoshihiro Watanabe, Kanagawa (JP)

(73) Assignee: Japan Display Inc., Tokyo (JP)

(*) Notice: Subject to any disclaimer, the term of this patent is extended or adjusted under 35 U.S.C. 154(b) by 805 days.

(21) Appl. No.: 13/565,109

(22) Filed: Aug. 2, 2012

(65) Prior Publication Data

US 2013/0044510 A1 Feb. 21, 2013

(30) Foreign Application Priority Data

Aug. 16, 2011 (JP) ................................ 2011-177827

(51) Int. Cl.
*G02F 1/1335* (2006.01)
*G02B 5/02* (2006.01)

(52) U.S. Cl.
CPC ........ *G02F 1/133504* (2013.01); *G02B 5/0257* (2013.01); *G02B 5/0278* (2013.01); *G02F 1/133615* (2013.01); *G02F 1/133553* (2013.01); *G02F 2001/133616* (2013.01); *G02F 2001/133626* (2013.01); *G02F 2203/02* (2013.01)

(58) Field of Classification Search
CPC .... G02B 6/0038; G02B 6/006; G02B 6/0021; G02B 6/0028; G02B 6/0053; G02B 6/0031; B60Q 1/2607; F21V 13/04; F21V 5/04; F21S 48/1233; F21S 48/2212; F21S 48/1208; F21S 48/2118
USPC .................. 362/602, 603, 607, 520, 521, 308
See application file for complete search history.

(56) References Cited

U.S. PATENT DOCUMENTS

| | | | | |
|---|---|---|---|---|
| 7,108,414 B2 * | 9/2006 | McCollum et al. | ....... | F21V 5/00 362/603 |
| 8,823,900 B2 * | 9/2014 | Kubota | ............. | G02F 1/133526 349/57 |

FOREIGN PATENT DOCUMENTS

| | | |
|---|---|---|
| JP | 2771392 B2 | 4/1998 |
| JP | 11-007007 A | 1/1999 |
| JP | 11-109348 A | 4/1999 |
| JP | 11-326884 A | 11/1999 |
| JP | 11-326895 A | 11/1999 |
| JP | 2000-275408 | 6/2000 |
| JP | 2003-255316 | 10/2003 |
| JP | 3629991 B2 | 12/2004 |
| WO | WO 01-38932 A1 | 5/2001 |

* cited by examiner

*Primary Examiner* — Alan Cariaso
*Assistant Examiner* — Mark Tsidulko
(74) *Attorney, Agent, or Firm* — Wolf, Greenfield & Sacks, P.C.

(57) ABSTRACT

A display includes: a reflective or semi-transmissive display panel; a light-scattering layer disposed on a top surface of the display panel; and an auxiliary light source. The light-scattering layer is an anisotropic front scattering layer which relatively strongly scatters light incident from a specific direction within a first angle range and a second angle range. The light-scattering layer has a first scattering central axis and a second scattering central axis. The first angle range and a third angle range overlap each other in an angle sub-range not including a first specific angle and an incident-plane symmetrical angle symmetrical to a second specific angle. The auxiliary light source allows light therefrom incident from a side closer to the auxiliary light source or from a side closer to the display panel to mainly enter the light-scattering layer within the second angle range.

13 Claims, 21 Drawing Sheets

DISPLAY AND ELECTRONIC UNIT

BACKGROUND

The present technology relates to a reflective display or a semi-transmissive display having both a reflection section and a transmission section, and an electronic unit including the same.

In recent years, displays for mobile units such as cellular phones and electronic papers have been in increasing demand, and attention has been given to reflective displays. The reflective displays perform display by reflecting externally incident light (ambient light) by a reflective plate, and do not need a backlight. Consequently, power consumption is reduced by power for the backlight; therefore, a mobile unit using the reflective display is allowed to be driven for a longer time than a mobile unit using a transmissive display. Moreover, as the backlight is not necessary, the weight and size of the display are allowed to be reduced accordingly.

In the reflective display, to perform display with use of external light, it is necessary to include a layer having a scattering function in the display. For example, in Japanese Patent No. 2771392, there is disclosed a method of providing a scattering function to a reflective electrode by forming projections and recessions on the reflective electrode. Moreover, Japanese patent No. 3629991 and Japanese Unexamined Patent Application Publication Nos. H11-326895, H11-7007, H11-326884, and H11-109348 disclose a method of providing a scattering film on a top surface of a glass substrate, instead of providing projections and recessions on the reflective electrode.

SUMMARY

In the reflective display, viewability in a dark site is low; therefore, an auxiliary light source is preferably included in the reflective display. However, for example, in the case where a front scattering film having anisotropy in a scattering direction as the above-described scattering film is included in the reflective display, there is an issue that the position of the auxiliary light source is limited.

It is desirable to provide a display capable of having flexibility in placement of an auxiliary light source and an electronic unit including the display.

According to an embodiment of the technology, there is provided a first display including: a reflective or semi-transmissive display panel; a light-scattering layer disposed on a top surface of the display panel; and an auxiliary light source supplying light to the display panel through the light-scattering layer. The light-scattering layer is an anisotropic front scattering layer which relatively strongly scatters light incident from a specific direction within a first angle range and a second angle range and relatively weakly scatters light incident within an angle range other than the first and second angle ranges. The light-scattering layer has a first scattering central axis corresponding to a first specific angle in the first angle range and a second scattering central axis corresponding to a second specific angle in the second angle range. The first angle range and a third angle range which is an incident-plane symmetrical angle range symmetrical to the second angle range overlap each other in an angle sub-range not including the first specific angle and an incident-plane symmetrical angle symmetrical to the second specific angle. The auxiliary light source is configured to allow light therefrom incident from a side closer to the auxiliary light source or light therefrom reflected by the display panel to be incident from a side closer to the display panel to mainly enter the light-scattering layer within the second angle range.

Here, the "incident-plane symmetrical angle range" means an angle range symmetrical to the second angle range with respect to an incident plane where light enters from a specific direction at an angle within the second angle range. The "incident-plane-symmetrical angle" means an angle symmetrical to the second angle with respect to the incident plane where light enters from a specific direction at an angle within the second angle range.

According to an embodiment of the technology, there is provided a first electronic unit including a display, the display including: a reflective or semi-transmissive display panel; a light-scattering layer disposed on a top surface of the display panel; and an auxiliary light source supplying light to the display panel through the light-scattering layer. The light-scattering layer is an anisotropic front scattering layer which relatively strongly scatters light incident from a specific direction within a first angle range and a second angle range and relatively weakly scatters light incident within an angle range other than the first and second angle ranges. The light-scattering layer has a first scattering central axis corresponding to a first specific angle in the first angle range and a second scattering central axis corresponding to a second specific angle in the second angle range. The first angle range and a third angle range which is an incident-plane symmetrical angle range symmetrical to the second angle range overlap each other in an angle sub-range not including the first specific angle and an incident-plane symmetrical angle symmetrical to the second specific angle. The auxiliary light source is configured to allow light therefrom incident from a side closer to the auxiliary light source or light therefrom reflected by the display panel to be incident from a side closer to the display panel to mainly enter the light-scattering layer within the second angle range.

In the first display and the first electronic unit according to the embodiment of the technology, the second angle range is provided separately from the first angle range. Moreover, the first angle range and the third angle range which is an incident-plane-symmetrical angle range symmetrical to the second angle range overlap each other in an angle sub-range not including the first specific angle and the incident-plane symmetrical angle symmetrical to the second specific angle. Here, when the second angle range is used as a scattering range for using light from the auxiliary light source to display an image, and the first angle range is used as a scattering range for using environmental light to display an image, it is not necessary to place the auxiliary light source to allow light to mainly enter the first angle range (except for the third angle range).

According to an embodiment of the technology, there is provided a second display including: a reflective or semi-transmissive display panel; a light-scattering layer disposed on a top surface of the display panel; and an auxiliary light source supplying light to the display panel through the light-scattering layer. The light-scattering layer is an anisotropic front scattering layer which relatively strongly scatters light incident from a specific direction within a first angle range and a second angle range and relatively weakly scatters light incident within an angle range other than the first and second angle ranges. The light-scattering layer has a first scattering central axis corresponding to a first specific angle in the first angle range and a second scattering central axis corresponding to a second specific angle in the second angle range. The first angle range and the second angle range overlap each other in an angle sub-range not including the first specific angle and the second specific angle. The auxiliary light source is configured to allow light therefrom incident from a side closer to the auxiliary light source or light therefrom reflected by the display panel to be incident from a side closer to the display panel to mainly enter the light-scattering layer within the second angle range.

According to an embodiment of the technology, there is provided a second electronic unit including a display, the display including: a reflective or semi-transmissive display panel; a light-scattering layer disposed on a top surface of the display panel; and an auxiliary light source supplying light to the display panel through the light-scattering layer. The light-scattering layer is an anisotropic front scattering layer which relatively strongly scatters light incident from a specific direction within a first angle range and a second angle range and relatively weakly scatters light incident within an angle range other than the first and second angle ranges. The light-scattering layer has a first scattering central axis corresponding to a first specific angle in the first angle range and a second scattering central axis corresponding to a second specific angle in the second angle range. The first angle range and the second angle range overlap each other in an angle sub-range not including the first specific angle and the second specific angle. The auxiliary light source is configured to allow light therefrom incident from a side closer to the auxiliary light source or light therefrom reflected by the display panel to be incident from a side closer to the display panel to mainly enter the light-scattering layer within the second angle range.

In the second display and the second electronic unit according to the embodiment of the technology, the second angle range is provided separately from the first angle range. Moreover, the first angle range and the second angle range overlap each other in an angle sub-range not including the first specific angle and the second specific angle. Here, when the second angle range is used as a scattering range for using light from the auxiliary light source to display an image, and the first angle range is used as a scattering range for using environmental light to display an image, it is not necessary to place the auxiliary light source to allow light to mainly enter the first angle range (except for the second angle range).

In the first and second displays and the first and second electronic units, it is not necessary to place the auxiliary light source to allow light to mainly enter the first angle range (except for the second angle range and the third angle range); therefore, flexibility in placement of the auxiliary light source is allowed to be provided.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION OF THE PREFERRED EMBODIMENTS

A preferred embodiment of the technology will be described in detail below referring to the accompanying drawings. It is to be noted that description will be given in the following order.
1. Embodiment (display)
2. Modifications (display)
3. Application Example (electronic unit)

1. Embodiment

Configuration

Figure 1:
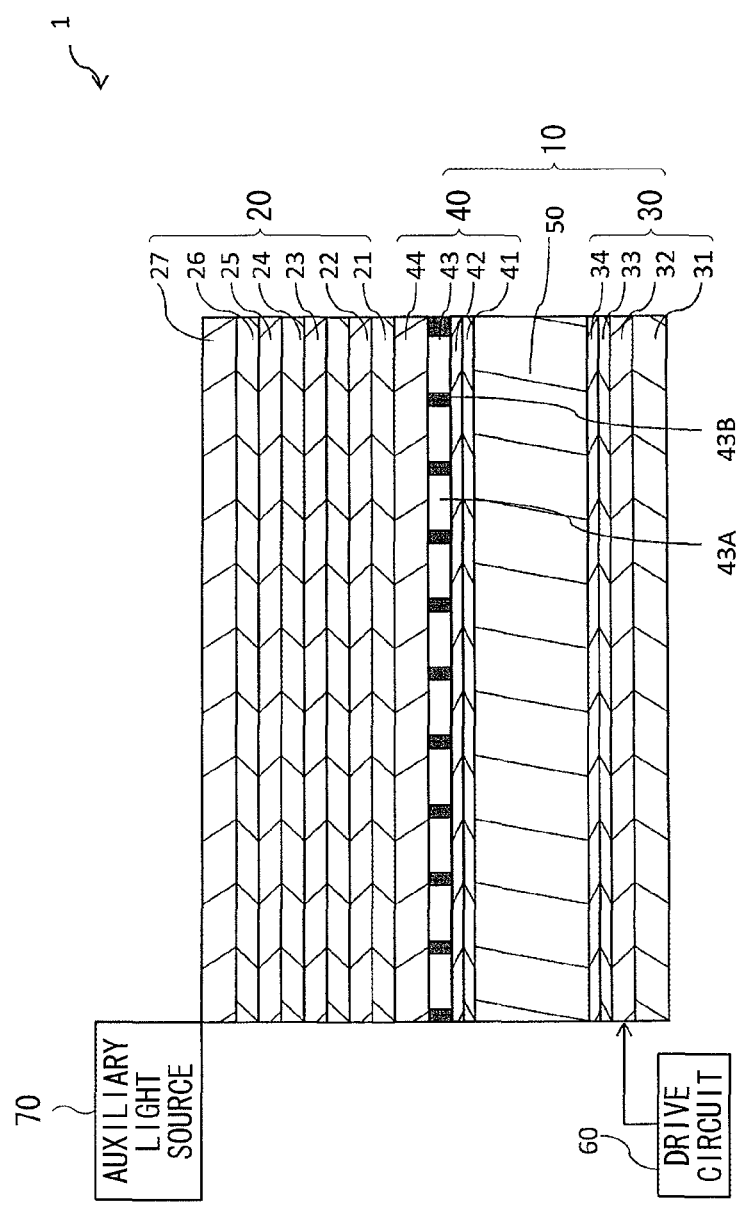
FIG. 1 is a sectional view illustrating an example of a configuration of a display according to an embodiment of the technology.

FIG. 1 illustrates an example of a sectional configuration of a display 1 according to an embodiment of the technology. It is to be noted that FIG. 1 is a schematic illustration, and dimensions and shapes in the illustration are not necessarily the same as actual dimensions and shapes. For example, as illustrated in FIG. 1, the display 1 includes a liquid crystal display panel 10, an optical laminate 20 disposed on a top surface of the liquid crystal display panel 10, a drive circuit 60 driving the liquid crystal display panel 10, and an auxiliary light source 70. In the display 1, a top surface of the optical laminate 20 is an image display surface, and a light source such as a backlight is not disposed behind the liquid crystal display panel 10. It is to be noted that the display 1 corresponds to a specific example of "display" in the technology, and the liquid crystal display panel 10 corresponds to a specific example of "display panel" in the technology. Moreover, the auxiliary light source 70 corresponds to a specific example of "auxiliary light source" in the technology.

Liquid Crystal Display Panel 10

The liquid crystal display panel 10 is a reflective or a semi-transmissive liquid crystal panel. For example, as illustrated in FIG. 1, the liquid crystal display panel 10 includes a lower substrate 30, an upper substrate 40, and a liquid crystal layer 50 sandwiched between the lower substrate 30 and the upper substrate 40.

Liquid Crystal Layer 50

The liquid crystal layer 50 is made of, for example, a nematic liquid crystal. The liquid crystal layer 50 is driven based on an image signal, and has a modulation function of allowing light incident to the liquid crystal layer 50 to pass therethrough or blocking the light in each pixel by application of a voltage based on the image signal. It is to be noted that the gray scale of each pixel is adjusted by varying the light transmission level of the liquid crystal.

Lower Substrate 30

For example, as illustrated in FIG. 1, the lower substrate 30 includes a driver board 31 on which a TFT (Thin Film Transistor) or the like is formed, an insulating layer 32 covering the TFT or the like, a reflective electrode layer 33 electrically connected to the TFT or the like, and an alignment film 34 formed on a top surface of the reflective electrode layer 33.

The driver board 31 includes, for example, a pixel circuit including a TFT, a capacitive device, or the like on a transparent substrate made of, for example, a glass substrate. The transparent substrate may be made of a material other than the glass substrate, for example, a translucent resin substrate, quartz, or a silicon substrate.

The reflective electrode layer 33 drives the liquid crystal layer 50 with a transparent electrode layer 42 (which will be described later) disposed in the upper substrate 40, and is configured of, for example, a plurality of pixel electrodes two-dimensionally arranged in a plane. When a voltage is applied to the pixel electrodes and the transparent electrode layer 42, an electrical field corresponding to a potential difference between the pixel electrodes and transparent electrode layer 42 is generated between the pixel electrodes and the transparent electrode layer 42, and the liquid crystal layer 50 is driven according to the magnitude of the electrical field. A portion corresponding to a portion where each pixel electrode and the transparent electrode layer 42 face each other in the display 1 is a minimum unit where the liquid crystal layer 50 is allowed to be partially driven by a voltage applied between the pixel electrode and the transparent electrode layer 42. This minimum unit corresponds to a pixel of the liquid crystal display panel 10. Moreover, the reflective electrode layer 33 functions as a reflective layer reflecting environmental light incident thereto through the liquid crystal layer 50 toward the liquid crystal layer 50. The reflective electrode layer 33 is made of a conductive material reflecting visible light, for example, a metal material such as Ag. A surface of the reflective electrode layer 33 is, for example, a mirror-finished surface.

The alignment film 34 aligns liquid crystal molecules in the liquid crystal layer 50 in a predetermined direction, and is directly in contact with the liquid crystal layer 50. The alignment film 34 is made of a polymer material such as polyimide, and is formed by performing a rubbing process on coated polyimide or the like.

Upper Substrate 40

For example, as illustrated in FIG. 1, the upper substrate 40 includes an alignment film 41, a transparent electrode layer 42, a color filter (CF) layer 43, and a transparent substrate 44 in this order from a side closer to the liquid crystal layer 50.

The alignment film 41 aligns liquid crystal molecules in the liquid crystal layer 50 in a predetermined direction, and is directly in contact with the liquid crystal layer 50. The alignment film 41 is made of a polymer material such as polyimide, and is formed by performing a rubbing process on coated polyimide or the like.

The transparent electrode layer 42 is disposed to face respective pixel electrodes, and is, for example, a sheet-like electrode formed on an entire plane. As the transparent electrode layer 42 is disposed to face respective pixel electrodes, the transparent electrode layer 42 functions as a common electrode for pixels. The transparent electrode layer 42 is made of a conductive material transparent to environmental light, for example, ITO (Indium Tin Oxide).

The CF layer 43 includes a color filter 43A in a region facing the pixel electrode and a light-shielding film 43B in a region not facing the pixel electrode. In the color filter 43A, color filters separating light having passed through the liquid crystal layer 50 into, for example, three primary colors of red, green, and blue, respectively, are arranged corresponding to pixels, respectively. The light-shielding film 43B has, for example, a function of absorbing visible light. The light-shielding film 43B is formed between pixels. The transparent substrate 44 is configured of a substrate transparent to environmental light, for example, a glass substrate.

Optical Laminate 20

For example, as illustrated in FIG. 1, the optical laminate 20 includes light-scattering layers 21 to 24, a ¼λ plate 25, a ½λ plate 26, and a polarizing plate 27 in this order from a side closer to the liquid crystal layer 50 on a top surface of the transparent substrate 44. The light-scattering layers 21 to 24, the ¼λ plate 25, the ½λ plate 26, and the polarizing plate 27 each are bonded to an adjacent layer with a sticking layer or an adhesive layer.

The light-scattering layers 21 to 23 are light-scattering layers for environmental light, and the light-scattering layer 24 is a light-scattering layer for the auxiliary light source 70. The light-scattering layers 21 to 24 are anisotropic front scattering layers which relatively strongly scatter light incident from a specific direction within a specific angle range and relatively weakly scatter light incident within an angle range other than the specific angle range. The above-described specific direction is, for example, a direction parallel to a main perspective direction. Here, the main perspective direction corresponds to a direction where a user of the display 1 views an image display surface when the user uses the display 1, and when the image display surface has a square shape, the main perspective direction corresponds to a direction orthogonal to a side closest to the user of the image display surface. In the light-scattering layers 21 to 24, a scattering distribution of scattered light has, for example, isotropy. It is to be noted that, in the light-scattering layers 21 to 24, the scattering distribution of the scattered light may have anisotropy extending in the main perspective direction.

Figure 2:
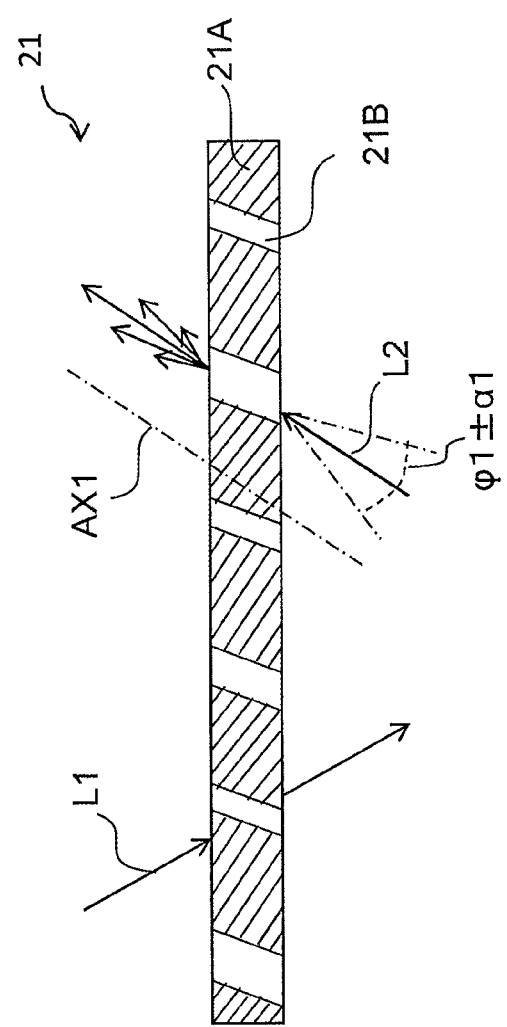
FIG. 2 is a diagram illustrating an example of a configuration and a function of a lowermost layer in three light-scattering layers for environmental light in FIG. 1.

FIGS. 2 to 5 schematically illustrate examples of optical functions of the light-scattering layers 21 to 24 together with examples of sectional configurations of the light-scattering layers 21 to 24. For example, as illustrated in FIG. 2, the light-scattering layer 21 is an anisotropic scattering layer which relatively strongly scatters a light component incident from the specific direction within a specific angle range $\phi 1 \pm \alpha 1$ in light L2 incident from a bottom surface thereof, and relatively weakly scatters other light components (for example, light L1 in the drawing). The light-scattering layer 21 has a scattering central axis corresponding to a specific angle within the specific angle range $\phi 1 \pm \alpha 1$. For example, as illustrated in FIG. 2, the light-scattering layer 21 has a scattering central axis AX1 where scattering of light L2 peaks when the light L2 is incident at an incident angle $\psi$ from the bottom surface thereof.

It is to be noted that "incident angle" indicates an angle between an optical axis of light and a normal to a light incident plane. Moreover, "scattering of light L2 peaks when the light L2 is incident at an incident angle $\psi 1$" means that when the light L2 is scattered by the light-scattering layer 21 to exit to a top surface of the light-scattering layer 21, the incident angle of the light L2 where the scattering range of the scattered light is maximized is $\psi 1$. Therefore, the scattering central axis AX1 indicates an axis extending in a direction intersecting with a normal to the light-scattering layer 21 at the angle $\psi 1$. The angle $\psi 1$ of the scattering central axis AX1 is, for example, 30°.

Figure 3:
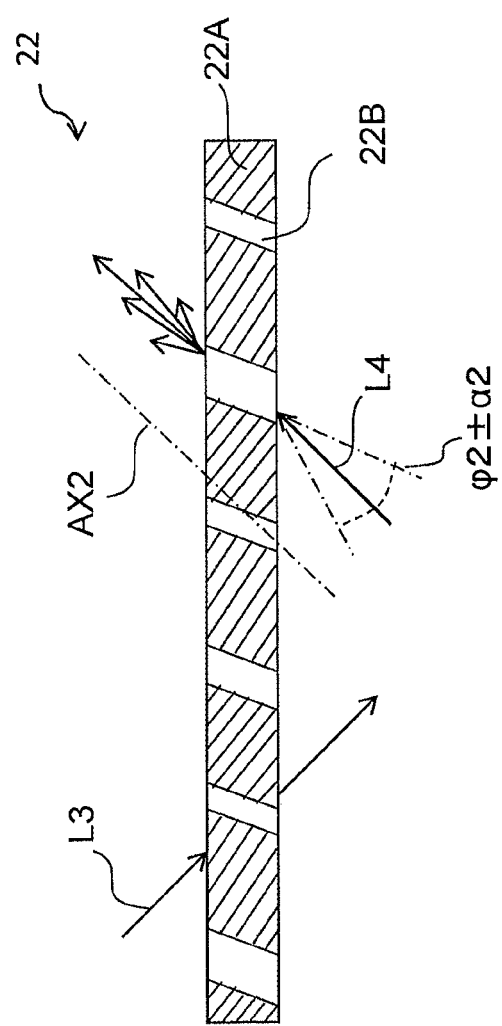
FIG. 3 is a diagram illustrating an example of a configuration and a function of a middle layer in the three light-scattering layers for environmental light in FIG. 1.

For example, as illustrated in FIG. 3, the light-scattering layer 22 is an anisotropic scattering layer which relatively strongly scatters a light component incident from the specific direction within a specific angle range $\phi \pm \alpha 2$ in light L4 incident from a bottom surface thereof, and relatively weakly scatters other light components (for example, light L3 in the drawing). The light-scattering layer 22 has a scattering central axis corresponding to a specific angle within the specific angle range $\phi \pm \alpha 2$. For example, as illustrated in FIG. 3, the light-scattering layer 22 has a scattering central axis AX2 where scattering of the light L4 peaks when the light L4 is incident at an incident angle $\psi 2$ from the bottom surface thereof.

It is to be noted that "scattering of the light L4 peaks when the light L4 is incident at an incident angle $\psi 2$" means that when the light L4 is scattered by the light-scattering layer 22 to exit to a top surface of the light-scattering layer 22, the incident angle of the light L4 where the scattering range of the scattered light is maximized is $\psi 2$. Therefore, the scattering central axis AX2 indicates an axis extending in a direction intersecting with a normal to the light-scattering layer 22 at the angle $\psi 2$. The angle $\psi 2$ of the scattering central axis AX2 is, for example, 45°.

Figure 4:
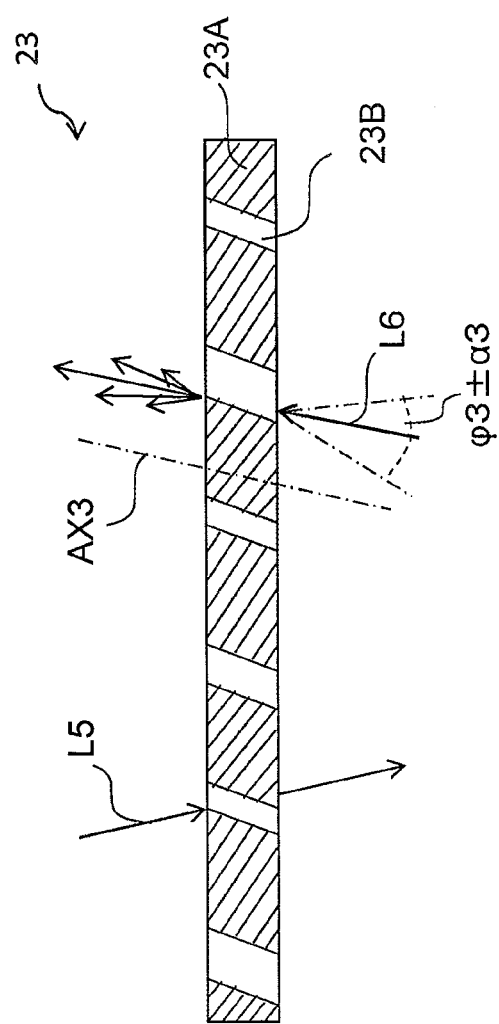
FIG. 4 is a diagram illustrating an example of a configuration and a function of an uppermost layer in the three light-scattering layers for environmental light in FIG. 1.

For example, as illustrated in FIG. 4, the light-scattering layer 23 is an anisotropic scattering layer which relatively strongly scatters a light component incident from the specific direction within a specific angle range $\phi 3 \pm \alpha 3$ in light L6 incident from a bottom surface thereof, and relatively weakly scatters other light components (for example, light L5 in the drawing). The light-scattering layer 23 has a scattering central axis corresponding to a specific angle within the specific angle range $\phi 3 \pm \alpha 3$. For example, as illustrated in FIG. 4, the light-scattering layer 23 has a scattering central axis AX3 where scattering of the light L6 peaks when the light L6 is incident at an incident angle $\psi 3$ from the bottom surface thereof.

It is to be noted that "scattering of the light L6 peaks when the light L6 is incident at an incident angle $\psi 3$" means that when the light L6 is scattered by the light-scattering layer 23 to exit to a top surface of the light-scattering layer 23, the incident angle of the light L6 where the scattering range of the scattered light is maximized is $\psi 3$. Therefore, the scattering central axis AX3 indicates an axis extending in a direction intersecting with a normal to the light-scattering layer 23 at the angle $\psi 3$. The angle $\psi 3$ of the scattering central axis AX3 is, for example, 10°.

Figure 5:
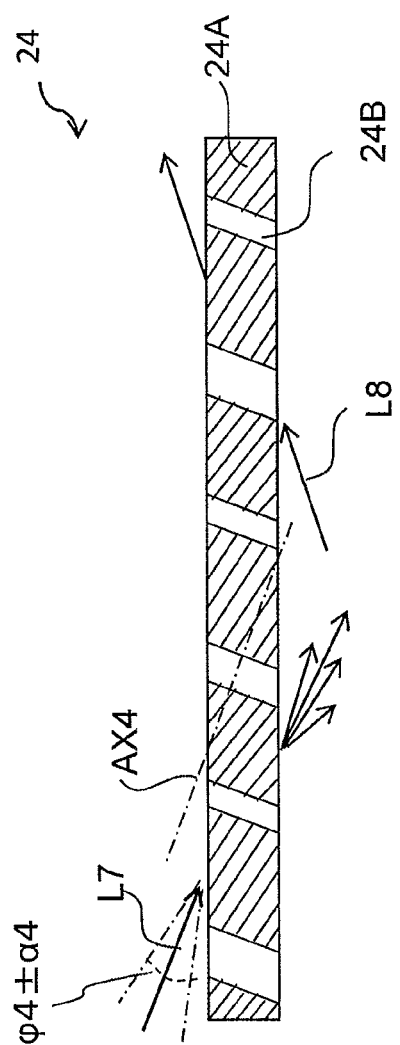
FIG. 5 is a diagram illustrating an example of a configuration and a function of a light-scattering layer for auxiliary light source in FIG. 1.

For example, as illustrated in FIG. 5, the light-scattering layer 24 is an anisotropic scattering layer which relatively strongly scatters a light component incident from the specific direction within a specific angle range $\phi 4 \pm \alpha 4$ in light L7 incident from a top surface thereof, and relatively weakly scatters other light components (for example, light L8 in the drawing). The light-scattering layer 24 has a scattering central axis corresponding to a specific angle within the specific angle range $\phi 4 \pm \alpha 4$. For example, as illustrated in FIG. 5, the light-scattering layer 24 has a scattering central axis AX4 where scattering of the light L7 peaks when the light L7 is incident at an incident angle $\psi 4$ from the top surface thereof.

It is to be noted that "scattering of the light L7 peaks when the light L7 is incident at an incident angle $\psi 4$" means that when the light L7 is scattered by the light-scattering layer 24 to exit to the bottom surface of the light-scattering layer 24, the incident angle of the light L7 where the scattering range of the scattered light is maximized is $\psi 4$. Therefore, the scattering central axis AX4 indicates an axis extending in a direction intersecting with a normal to the light-scattering layer 24 at the angle $\psi 4$. The angle $\psi 4$ of the scattering central axis AX4 is, for example, 85°.

The angle $\psi 2$ of the scattering central axis AX2 of the light-scattering layer 22 which is a middle layer in the three light-scattering layers 21 to 23 is larger than the angles $\psi 1$ and $\psi 3$ of the scattering axes AX1 and AX3 of the other light-scattering layers 21 and 23 to widen a viewing angle. Moreover, the angle $\psi 3$ of the scattering central axis AX3 of the light-scattering layer 23 which is an uppermost layer in the three light-scattering layers 21 to 23 is smaller than the angles $\psi 1$ and $\psi 2$ of the scattering central axes AX1 and AX2 of the other light-scattering layers 21 and 22 to enhance luminance in a front direction. The angle $\psi 4$ of the scattering central axis AX4 of the light-scattering layer 24 is larger than the angles $\psi 1$ to $\psi 3$ of the scattering central axes AX1 to AX3 of the three light-scattering layers 21 to 23.

For example, as illustrated in FIG. 2, the light-scattering layer 21 includes two kinds of regions with different refractive indices from each other (first regions 21A and second regions 21B). Likewise, for example, as illustrated in FIG. 3, the light-scattering layer 22 includes two kinds of regions with different refractive indices from each other (first regions 22A and second regions 22B). For example, as illustrated in FIG. 4, the light-scattering layer 23 includes two kinds of regions with different refractive indices from each other (first regions 23A and second regions 23B). For example, as illustrated in FIG. 5, the light-scattering layer 24 includes two kinds of regions with different refractive indices from each other (first regions 24A and second regions 24B). The light-scattering layers 21 to 24 each may have a louver configuration or a columnar configuration (not illustrated).

The first regions 21A and the second regions 21B are formed to extend in a thickness direction of the light-scattering layer 21 and be inclined in a predetermined direction. Likewise, the first regions 22A and the second regions 22B are formed to extend in a thickness direction of the light-scattering layer 22 and be inclined in a predetermined direction. The first regions 23A and the second regions 23B are formed to extend in a thickness direction of the light-scattering layer 23 and be inclined in a predetermined direction. The first regions 24A and the second regions 24B are formed to extend in a thickness direction of the light-scattering layer 24 and be inclined in a predetermined direction. The light-scattering layers 21 to 24 are formed by applying ultraviolet light, from an oblique direction, to a resin sheet made of a mixture of two or more kinds of photopolymerizable monomers or oligomers with different refractive indices from each other, for example. It is to be noted that the light-scattering layers 21 to 24 each may have a configuration different from the above-described configuration, or may be manufactured by a method different from the above-described method. The light-scattering layers 21 to 24 may have configurations which are the same as or different from one another.

Figure 6:
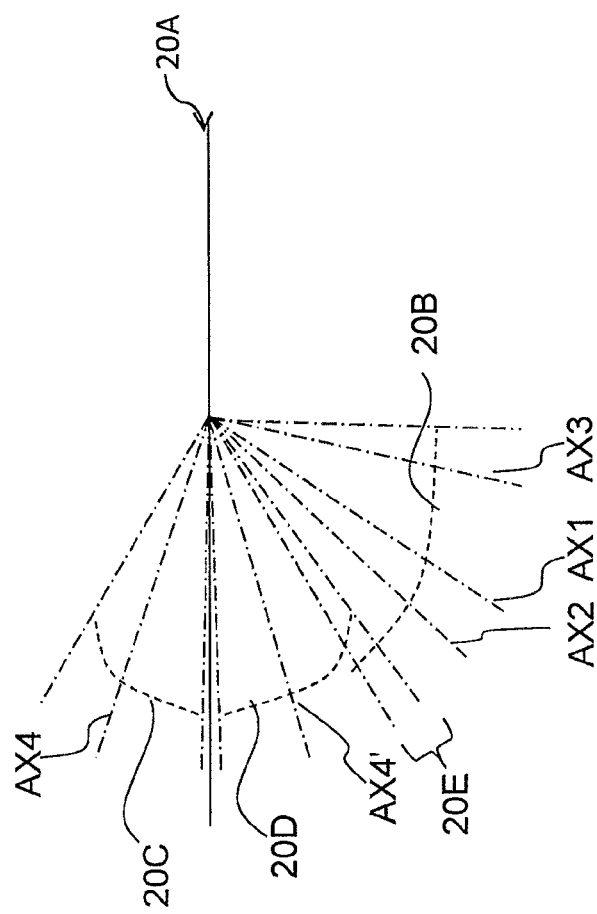
FIG. 6 is a diagram illustrating an example of a relationship between scattering ranges of the respective light-scattering layers in FIG. 1.

FIG. 6 schematically illustrates scattering characteristics of the light-scattering layers 21 to 24. In FIG. 6, a first angle range 20B is an angle range configured of a combination of angle ranges $\phi 1\pm\alpha 1$, $\phi 2\pm\alpha 2$, and $\phi 3\pm\alpha 3$ (not illustrated) of the light-scattering layers 21 to 23. A scattering central axis AX4' is symmetrical to the scattering central axis AX4 with respect to an incident plane 20A in a direction of a normal to the incident plane 20A. The second angle range 20C corresponds to the angle range $\phi 4\pm\alpha 4$ of the light-scattering layer 24. A third angle range 20D is symmetrical to the angle range $\phi 4\pm\alpha 4$ of the light-scattering layer 24 with respect to the incident plane 20A in the direction of the normal to the incident plane 20A. An overlap angle range 20E is an angle range where the first angle range 20B and the third angle range 20D overlap each other. While the overlap angle range 20E is a small region in the first angle range 20B, the overlap angle range 20E makes up a relatively large proportion of the third angle range 20D.

In FIG. 6, the first angle range 20B and the third angle range 20D overlap each other in an angle sub-range (the overlap angle range 20E) not including the scattering central axes AX1 to AX3 and AX4'. Therefore, the light-scattering layer 24 scatters light incident to a top surface thereof within an angle range to which the overlap angle range 20E is symmetrical with respect to the incident plane 20A in the direction of the normal to the incident plane 20A. Moreover, one or more of the light-scattering layers 21 to 23 scatter light incident to a bottom surface thereof within the overlap angle range 20E. However, as described above, the overlap angle range 20E is a small region for the first angle range 20B. Therefore, when light hardly having a component of the overlap angle range 20E in the first angle range 20B (typically environmental light) enters the top surface of the light-scattering layer 24, the light-scattering layer 24 exerts little effect on the light and allows the light to pass therethrough. Therefore, while the light-scattering layer 24 effectively scatters light from the auxiliary light source 70, the light-scattering layer 24 exerts little effect on light hardly having the component of the overlap angle range 20E, such as environmental light.

Drive Circuit 60

Auxiliary Light Source 70

The drive circuit 60 drives respective pixels in the liquid crystal display panel 10 by applying, for example, a voltage based on an image signal to respective pixel electrodes included in the refractive electrode layer 33. The auxiliary light source 70 is used to compensate for lack of environmental light when illuminance of environmental light is not sufficient (for example, during the night or indoors). The auxiliary light source 70 is disposed in a region not facing the image display surface, and, for example, as illustrated in FIG. 1, the auxiliary light source 70 is disposed beside the image display surface. The auxiliary light source 70 includes, for example, an LED (Light Emitting Diode) with directivity, and light from the auxiliary light source 70 enters the entire image display surface. The auxiliary light source 70 supplies light to the liquid crystal display panel 10 through the optical laminate 20 including the light-scattering layers 21 to 24. More specifically, the auxiliary light source 70 is configured to allow light therefrom to mainly enter the light-scattering layer 24 within the second angle range 20C. In other words, it is not necessary to place the auxiliary light source 70 to allow light therefrom to enter the first angle range 20B (except for the overlap angle range 20E) used for image display with use of environmental light.

Here, as the second angle range 20C is an angle range corresponding to the angle range $\phi 4\pm\alpha 4$ of the light-scattering layer 24, the incident angle of the light from the auxiliary light source 70 to the image display surface or the light-scattering layer 24 is also extremely large. Moreover, the incident angle of the light from the auxiliary light source 70 to the light-scattering layer 24 is smaller closer to the auxiliary light source 70 and larger farther from the auxiliary light source 70. In other words, the incident angle of the light from the auxiliary light source 70 to the light-scattering layer 24 has a relatively large width.

Functions and Effects

Figure 7:
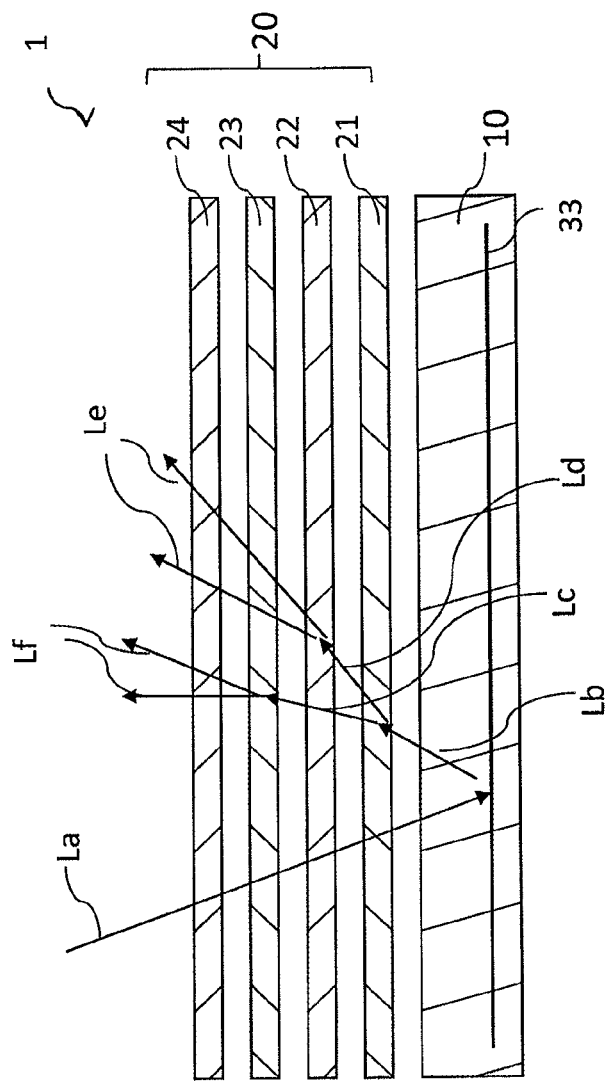
FIG. 7 is a conceptual diagram illustrating an example of image display with use of environmental light in the display in FIG. 1.
Figure 8:
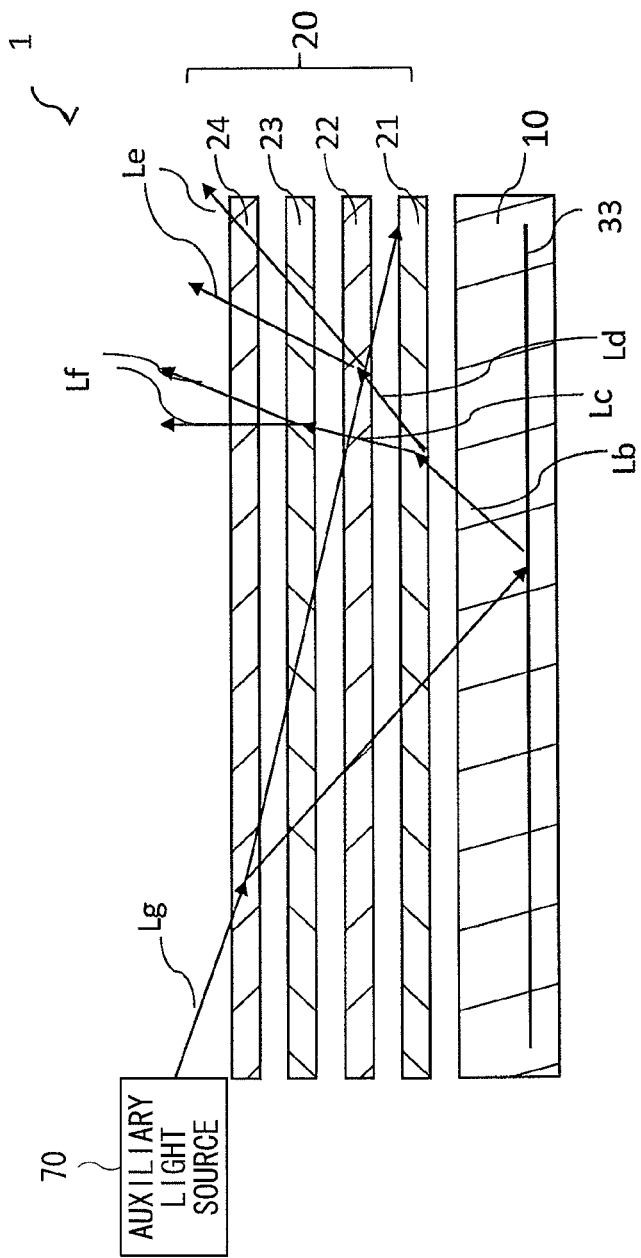
FIG. 8 is a conceptual diagram illustrating an example of image display with use of light from the auxiliary light source in the display in FIG. 1.

Next, referring to FIGS. 7 and 8, an example of functions and effects of the display 1 according to the embodiment will be described below. FIG. 7 schematically illustrates image display with use of environmental light. FIG. 8 schematically illustrates image display with use of light from the auxiliary light source 70. It is to be noted that the ¼λ plate 25, the ½λ plate 26, and the polarizing plate 27 are not illustrated in FIGS. 7 and 8.

Image Display with Use of Environmental Light

Environmental light La incident from a specific direction at an angle (for example, at an incident angle of 30°) within a specific range is converted into linearly polarized light by the polarizing plate 27, and further converted into circularly polarized light by the ½λ plate 26 and the ¼λ plate 25 to reach the liquid crystal display panel 10. Light incident to a pixel to which a voltage is not applied in the environmental light La having reached the liquid crystal display panel 10 is converted into linearly polarized light by the liquid crystal layer 50 to reach the reflective electrode layer 33. Light reflected by the reflective electrode layer 33 (reflected light Lb) is converted back into circularly polarized light through a reversed path. The circularly polarized light is converted back into linearly polarized light by the ½λ plate 26 and the ¼λ plate 25, and passes through the polarizing plate 27. Therefore, in this case, the pixel is bright. Moreover, light incident to a pixel to which a voltage is applied in the environmental light La having reached the liquid crystal display panel 10 reaches the reflective electrode layer 33 in the form of circularly polarized light, and is reflected by the reflective electrode layer 33 to become circularly polarized light. Although the light is converted back into linearly polarized light by the ½λ plate 26 and the ¼λ plate 25, the polarization axis of the linearly polarized light is orthogonal to a transmission axis of the polarizing plate 27. Therefore, the linearly polarized light is absorbed by the polarizing plate 27. Accordingly, the pixel is dark.

The environmental light La passes through the light-scattering layers 21 to 24, and then reaches the liquid crystal display panel 10. However, the scattering intensity of the light-scattering layers 21 to 24 have incident-angle dependence; therefore, the environmental light La is hardly scattered by the light scattering layers 21 to 24 and passes through the light-scattering layers 21 to 24 to reach the liquid crystal display panel 10. On the other hand, the reflected light Lb passes through the light-scattering layers 21 to 24, and then exits from the liquid crystal display panel 10. At this time, as the reflected light Lb enters the bottom surface of the light-scattering layer 21 at, for example, an incident angle of 30°, the reflected light Lb is strongly scattered by the light-scattering layer 21. As scattered light Lc incident to the bottom surface of the light-scattering layer 22 at a small incident angle (approximately 10°) in light strongly scattered by the light-scattering layer 21 does not enter the scattering range of the light-scattering layer 22, the scattered light Lc is hardly scattered by the light-scattering layer 22 and passes through the light-scattering layer 22. On the other hand, scattered light Ld incident to the bottom surface of the light-scattering layer 22 at a large incident angle (approximately 60°) in the light strongly scattered by the light-scattering layer 21 is strongly scattered by the light-scattering layer 22.

The scattered light Lc hardly scattered by the light-scattering layer 22 and passing through the light-scattering layer 22 enters the bottom surface of the light-scattering layer 23 at a small incident angle (approximately 10°). Therefore, the scattered light Lc is strongly scattered by the light-scattering layer 23. Light strongly scattered by the light-scattering layer 23 is converted into scattered light Lf toward a front direction to enter the bottom surface of the light-scattering layer 24. As the scattered light Lf does not enter the scattering range of the light-scattering layer 24, the scattered light Lf is hardly scattered by the light-scattering layer 24 and passes through the light-scattering layer 24 to exit from the liquid crystal display panel 10.

On the other hand, scattered light Le strongly scattered by the light-scattering layer 22 and passing through the light-scattering layer 22 enters the bottom surface of the light-scattering layer 23 at a large incident angle (a much larger angle than 10°). As the scattered light Le does not enter the scattering range of the light-scattering layer 23, the scattered light Le is hardly scattered by the light-scattering layer 23 and passes through the light-scattering layer 23 to enter the bottom surface of the light-scattering layer 24. As the scattered light Le also does not enter the scattering range of the light-scattering layer 24, the scattered light Le is hardly scattered by the light-scattering layer 24 and passes through the light-scattering layer 24 to exit from the liquid crystal display panel 10.

Thus, in the embodiment, while a scattering range for the environmental light (the scattered light Lb) reflected by the liquid crystal display panel 10 to enter from the bottom surface side is allowed to be limited by the light-scattering layer 21, the scattering range is allowed to be expanded by the light-scattering layers 22 and 23 to be wider than the scattering range of the light-scattering layer 21, i.e., the lowermost layer. Moreover, variations in intensity at a boundary between high and low scattering intensities are allowed to be reduced. Thus, a visually natural image is allowed to be displayed.

Moreover, in the embodiment, as the angle ψ3 of the scattering central axis AX3 of the light-scattering layer 23 is smaller than the angles ψ1 and ψ2 of the scattering central axes AX1 and AX2 of the light-scattering layers 21 and 22, a natural image with less image blur is allowed to be displayed. Further, an image with high white luminance is allowed to be displayed.

In addition, in the embodiment, the scattered light Le and the scattered light Lf which are produced from the environmental light La are hardly affected by the light-scattering layer 24, and are allowed to pass through the light-scattering layer 24. In other words, the light-scattering layer 24 does not act on image display with use of the environmental light La.

Image Display with Use of Light from Auxiliary Light Source 70

Next, image display with use of light from the auxiliary light source 70 will be described below. Light (source light Lg) from the auxiliary light source 70 incident from a specific direction at an angle within a specific range (for example, an incident angle of 85°) is converted into linearly polarized light by the polarizing plate 27, and further converted into circularly polarized light by the ½λ plate 26 and the ¼λ plate 25 to reach the liquid crystal display panel 10. Light incident to a pixel to which a voltage is not applied in the source light Lg having reached the liquid crystal display panel 10 is converted into linearly polarized light by the liquid crystal layer 50 to reach the reflective electrode layer 33. Light reflected by the reflective electrode layer 33 (reflected light Lb) is converted back into circularly polarized light through a reversed path. The circularly polarized light is converted back into linearly polarized light by the ½λ plate 26 and the ¼λ plate 25, and passes through the polarizing plate 27. Therefore, in this case, the pixel is bright. Moreover, light incident to a pixel to which a voltage is applied in the source light Lg having reached the liquid crystal display panel 10 reaches the reflective electrode layer 33 in the form of circularly polarized light, and is reflected by the reflective electrode layer 33 to become circularly polarized light. Although the light is converted back into linearly polarized light by the ½λ plate 26 and the ¼λ plate 25, the polarization axis of the linearly polarized light is orthogonal to the transmission axis of the polarizing plate 27. Therefore, the linearly polarized light is absorbed by the polarizing plate 27. Accordingly, in this case, the pixel is dark.

The source light Lg mainly enters the light-scattering layer 24 within the second angle range 20C. Therefore, the source light Lg is strongly scattered by the light-scattering layer 24 and passes through the light-scattering layers 21 to 23 to reach the liquid crystal display panel 10. Light reflected by the liquid crystal display panel 10 (reflected light Lb) passes through the light-scattering layers 21 to 24, and then exits from the liquid crystal display panel 10. At this time, as a part of the reflected light Lb enters the bottom surface of the light-scattering layer 21 at, for example, an incident angle of 30°, the part of the reflected light Lb is strongly scattered by the light-scattering layer 21. As scattered light Lc incident to the bottom surface of the light-scattering layer 23 at a small incident angle (approximately 10°) in the light strongly scattered by the light-scattering layer 21 does not enter the scattering range of the light-scattering layer 22, the scattered light Lc is hardly scattered by the light-scattering layer 22 and passes through the light-scattering layer 22. On the other hand, scattered light Ld incident to the bottom surface of the light-scattering layer 22 at a large incident angle (approximately 60°) in the light strongly scattered by the light-scattering layer 21 is strongly scattered by the light-scattering layer 22.

The scattered light Lc hardly scattered by the light-scattering layer 22 and passing through the light-scattering layer 22 enters the bottom surface of the light-scattering layer 23 at a small incident angle (approximately 10°). Therefore, the scattered light Lc is strongly scattered by the light-scattering layer 23. The light strongly scattered by the light-scattering layer 23 is converted into scattered light Lf toward a front direction, and enters the bottom surface of the light-scattering layer 24. As the scattered light Lf does not enter the scattering range of the light-scattering layer 24, the scattered light Lf is hardly scattered by the light-scattering layer 24 and passes through the light-scattering layer 24 to exit from the liquid crystal display panel 10.

On the other hand, scattered light Le strongly scattered by the light-scattering layer 22 and passing through the light-scattering layer 22 enters the bottom surface of the light-scattering layer 23 at a large incident angle (a much larger angle than 10°). As the scattered light Le does not enter the scattering range of the light-scattering layer 23, the scattered light Le is hardly scattered by the light-scattering layer 23 and passes through the light-scattering layer 23 to enter the bottom surface of the light-scattering layer 24. As the scattered light Le also does not enter the scattering range of the light-scattering layer 24, the scattered light Le is hardly scattered by the light-scattering layer 24 and passes through the light-scattering layer 24 to exit from the liquid crystal display panel 10.

Thus, in the embodiment, the source light Lg incident at a very large angle is scattered by the light-scattering layer 24 to be used for image display. Therefore, viewability in a dark site is allowed to be enhanced. Moreover, in the embodiment, the auxiliary light source 70 is configured to allow light therefrom to mainly enter the light-scattering layer 24 within the second angle range 20C; therefore, it is not necessary to place the auxiliary light source 70 to allow light therefrom to mainly enter the first angle range 20B (except for the overlap angle range 20E). Accordingly, the auxiliary light source 70 is allowed to be placed without being restricted by the first angle range 20B (except for the overlap angle range 20E); therefore, flexibility in placement of the auxiliary light source 70 is allowed to be provided. Moreover, in the embodiment, the auxiliary light source 70 is placed in a region not facing the image display surface; therefore, an input interface such as a touch sensor is allowed to be mounted in the display 1.

2. Modifications

First Modification

Figure 9:
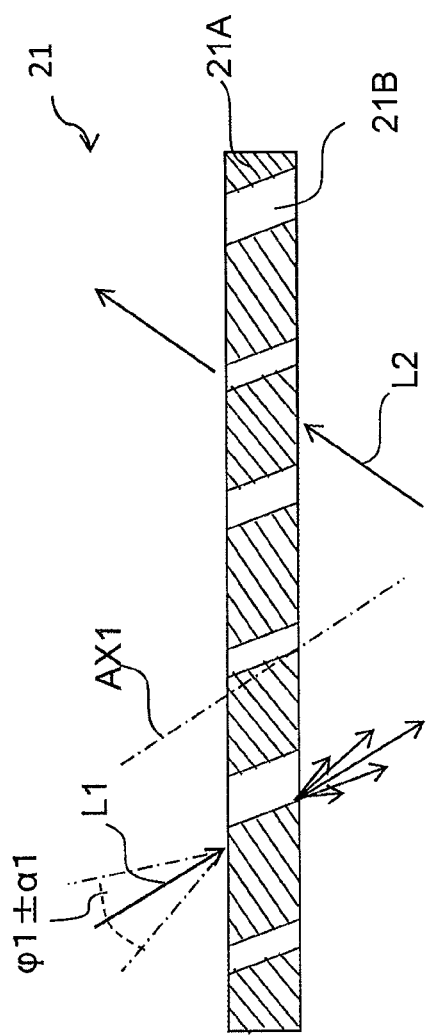
FIG. 9 is a diagram illustrating another example of the configuration and the function of the lowermost layer in the three light-scattering layers for environmental light in FIG. 1.
Figure 10:
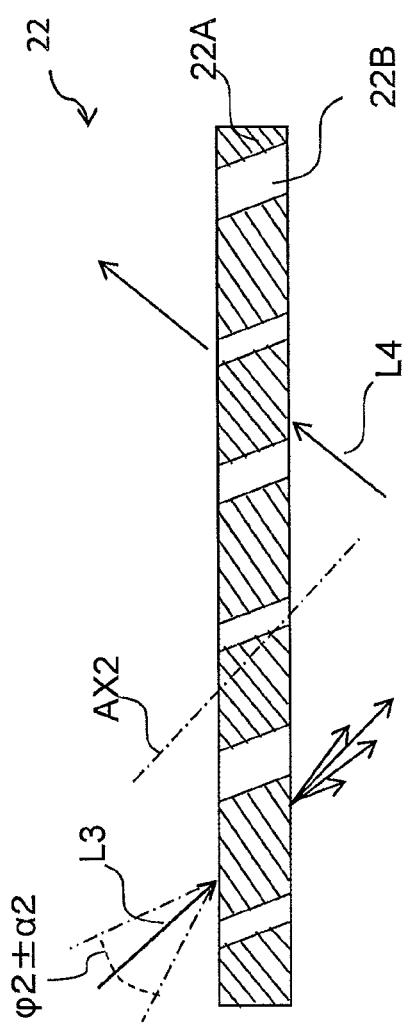
FIG. 10 is a diagram illustrating another example of the configuration and the function of the middle layer in the three light-scattering layers for environmental light in FIG. 1.
Figure 11:
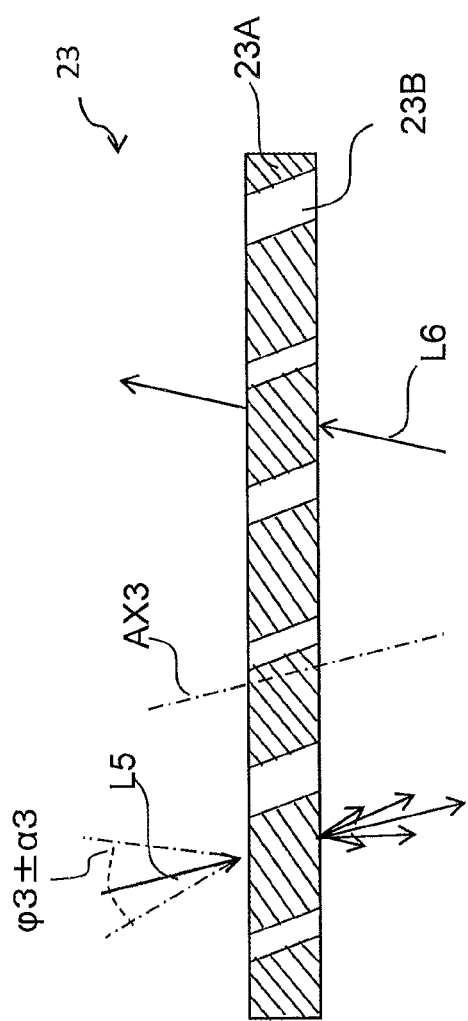
FIG. 11 is a diagram illustrating another example of the configuration and the function of the uppermost layer in the three light-scattering layers for environmental light in FIG. 1.

In the above-described embodiment, the light-scattering layers 21 to 23 are configured to scatter light when light is emitted therefrom; however, they may be configured to scatter light when light is incident thereto. More specifically, for example, as illustrated in FIGS. 9 to 11, the light-scattering layers 21 to 23 may strongly scatter a light component incident to the light-scattering layers 21 to 23 within the second angle range 20C and may weakly scatter a light component incident to the light-scattering layers 21 to 23 within an angle range other than the second angle range 20C.

Figure 12:
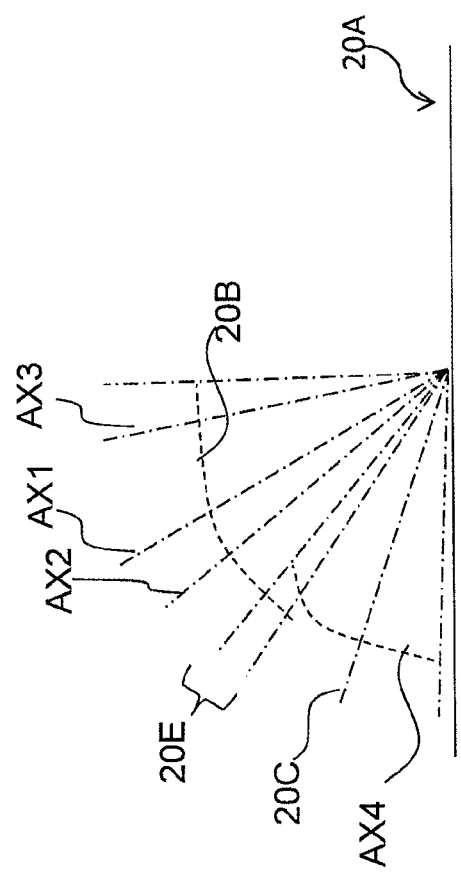
FIG. 12 is a diagram illustrating an example of a relationship between scattering ranges of the respective light-scattering layers in FIG. 5 and FIGS. 9 to 11.

As illustrated in FIG. 12 which schematically illustrates scattering characteristics of the light-scattering layers 21 to 24, also in the modification, the first angle range 20B and the second angle range 20C overlap each other in an angle subrange (the overlap angle range 20E) not including the scattering central axes AX1 to AX3 and AX4. Therefore, some of the light-scattering layers 21 to 23, and the light-scattering layer 24 scatter light incident to the bottom surface within the overlap angle range 20E. However, as described above, the overlap angle range 20E is a small region for the first angle range 20B. Therefore, when light hardly having a component of the overlap angle range 20E in the first angle range 20B (typically environmental light) enters the bottom surface of the light-scattering layer 24, the light-scattering layer 24 has little effect on the light and allows the light to pass therethrough. Therefore, while the light-scattering layer 24 effectively scatters the light from the auxiliary light source 70, the light-scattering layer 24 exerts little effect on light hardly having the component of the overlap angle range 20E, such as environmental light.

Second Modification

Figure 13:
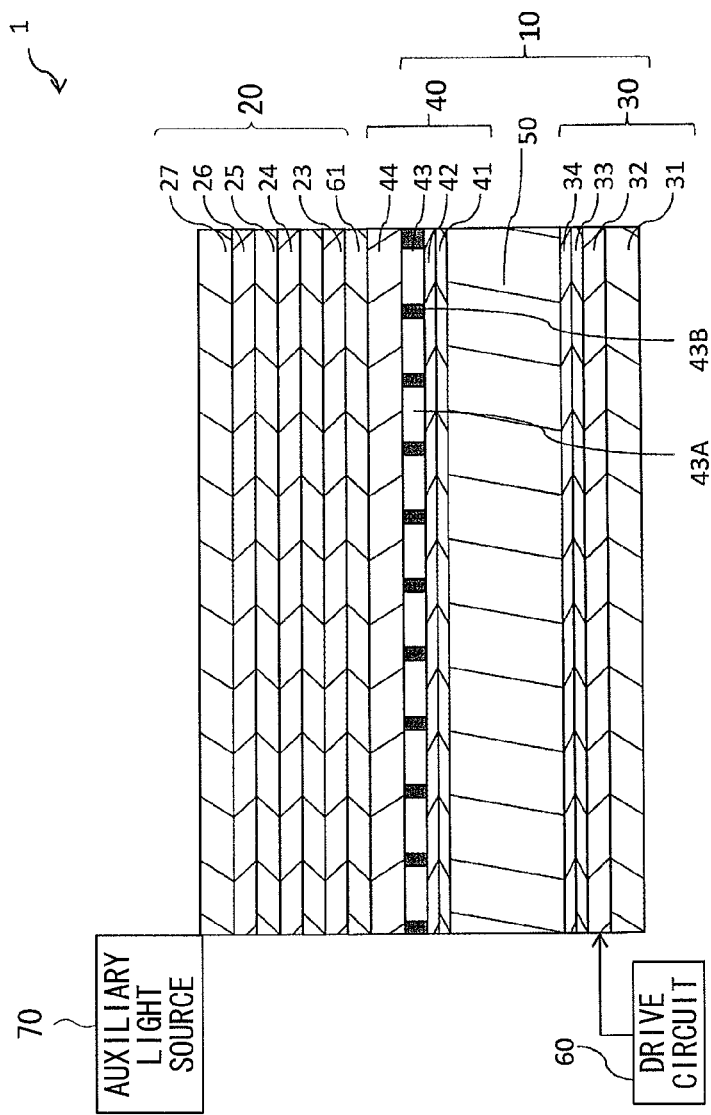
FIG. 13 is a sectional view illustrating a first modification of the configuration of the display in FIG. 1.

In the above-described embodiment, for example, as illustrated in FIG. 13, a single-layer light-scattering layer 61 having both functions of two light-scattering layers 21 and 22 may be included instead of the two light-scattering layers 21 and 22. At this time, the light-scattering layer 61 has a scattering central axis AX1 where scattering of incident light peaks when an incident angle of light incident from the bottom surface of the light-scattering layer 21 is $\psi 1$. Moreover, for example, the light-scattering layer 61 also has a scattering central axis AX2 where scattering of incident light peaks when an incident angle of light incident from the bottom surface of the light-scattering layer 22 is $\psi 2$. In other words, the light-scattering layer 61 has both the scattering central axis AX1 and the scattering central axis AX2. For example, the light-scattering layer 61 includes a bulk-like region and two kinds of rod-like regions. The bulk-like region and the rod-like regions have different refractive indices from each other. One of the two kinds of rod-like regions has a shape corresponding to the scattering central axis AX1, and the other has a shape corresponding to the scattering central axis AX2. The two kinds of the rod-like regions may have refractive indices which are equal to or different from each other. For example, the light-scattering layer 61 is formed by allowing three kinds of regions to extend in a thickness direction and be inclined in a predetermined direction.

Third Modification

Figure 14:
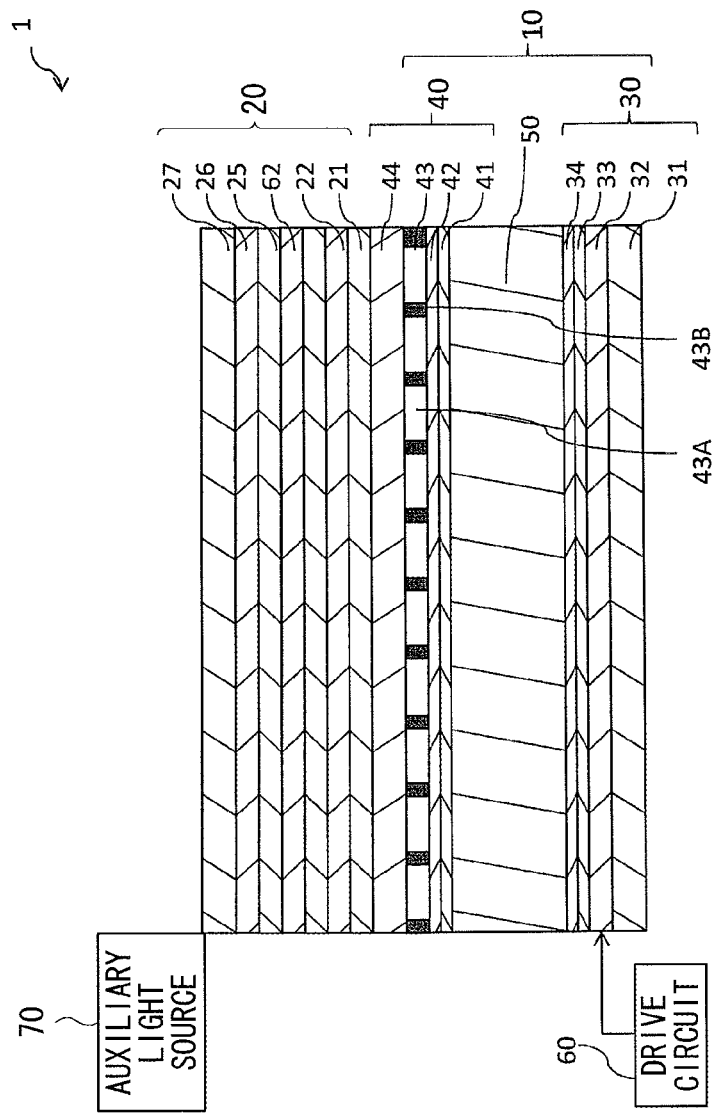
FIG. 14 is a sectional view illustrating a second modification of the configuration of the display in FIG. 1.

In the above-described embodiment, for example, as illustrated in FIG. 14, a single-layer light-scattering layer 62 having both functions of the light-scattering layers 23 and 24 may be included instead of the two light-scattering layers 23 and 24. At this time, for example, the light-scattering layer 62 has the scattering central axis AX3 where scattering of incident light peaks when an incident angle of light incident from the bottom surface of the light-scattering layer 23 is $\psi 3$. Moreover, for example, the light-scattering layer 62 has the scattering central axis AX4 where scattering of incident light peaks when an incident angle of light incident from the top surface of the light-scattering layer 24 is $\psi 4$. In other words, the light-scattering layer 62 has both the scattering central axis AX3 and the scattering central axis AX4. For example, the light-scattering layer 62 includes a bulk-like region and two kinds of rod-like regions. The bulk-like region and the rod-like regions have different refractive indices from each other. One of the two kinds of rod-like regions has a shape corresponding to the scattering central axis AX3, and the other has a shape corresponding to the scattering central axis AX4. The two kinds of the rod-like regions may have refractive indices which are equal to or different from each other. The light-scattering layer 62 is formed by allowing three kinds of regions to extend in a thickness direction and be inclined in a predetermined direction, for example.

Fourth Modification

Figure 15:
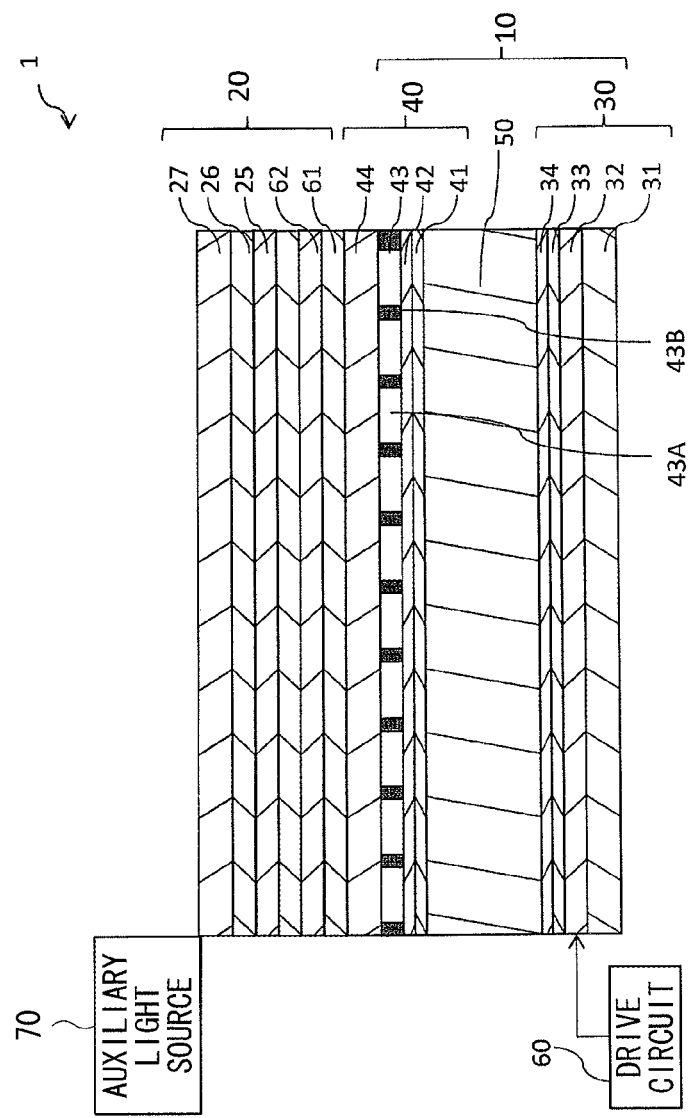
FIG. 15 is a sectional view illustrating a third modification of the configuration of the display in FIG. 1.

In the above-described embodiment, for example, as illustrated in FIG. 15, the light-scattering layer 61 may be included instead of the light-scattering layers 21 and 22, and the light-scattering layer 62 may be included instead of the light-scattering layers 23 and 24.

Fifth Modification

Figure 16:
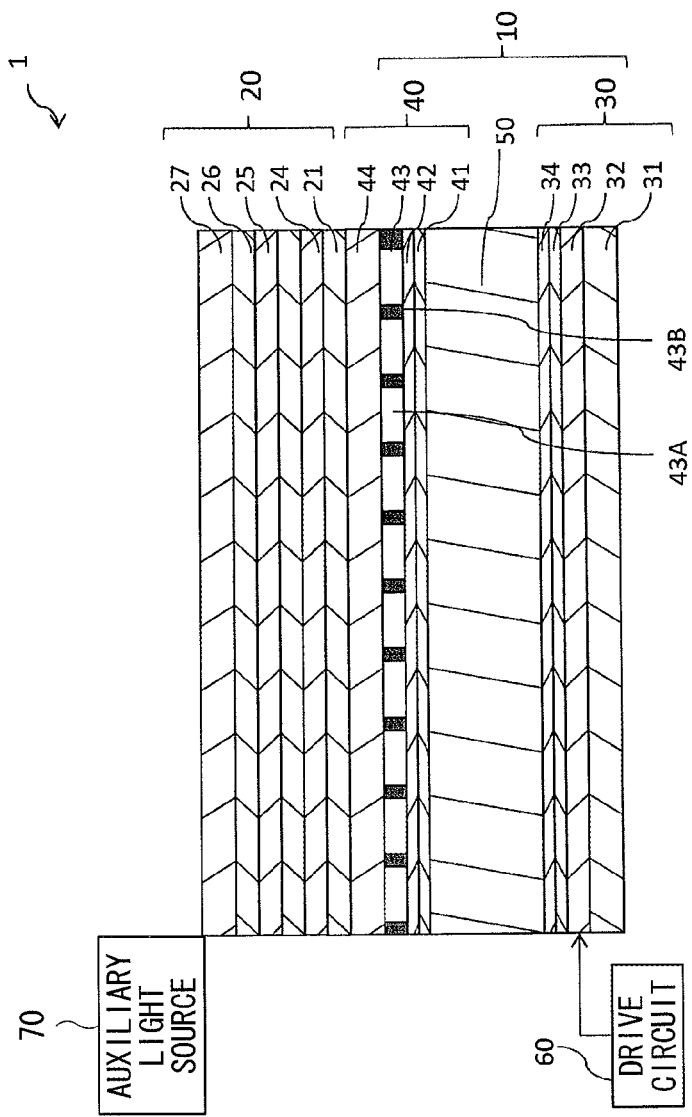
FIG. 16 is a sectional view illustrating a fourth modification of the configuration of the display in FIG. 1.

In the above-described embodiment, for example, as illustrated in FIG. 16, two light-scattering layers 22 and 23 may not be included, and only the light-scattering layer 21 may be included as a light-scattering layer for environmental light.

Sixth Modification

Figure 17:
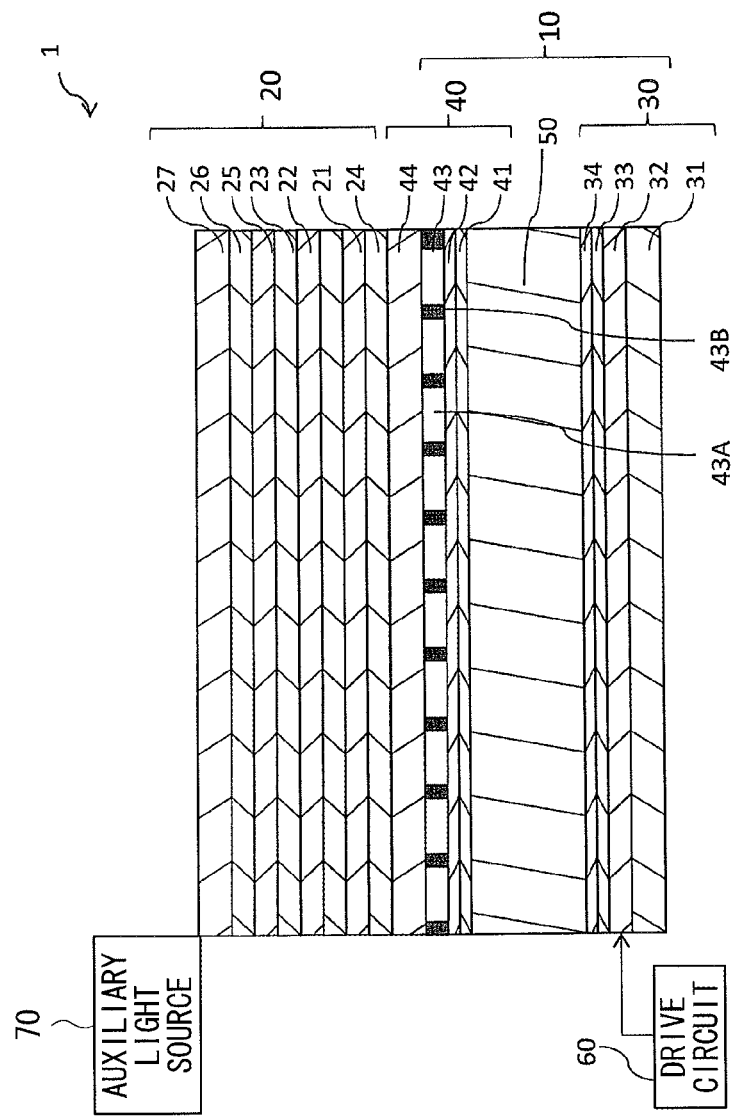
FIG. 17 is a sectional view illustrating a fifth modification of the configuration of the display in FIG. 1.
Figure 18:
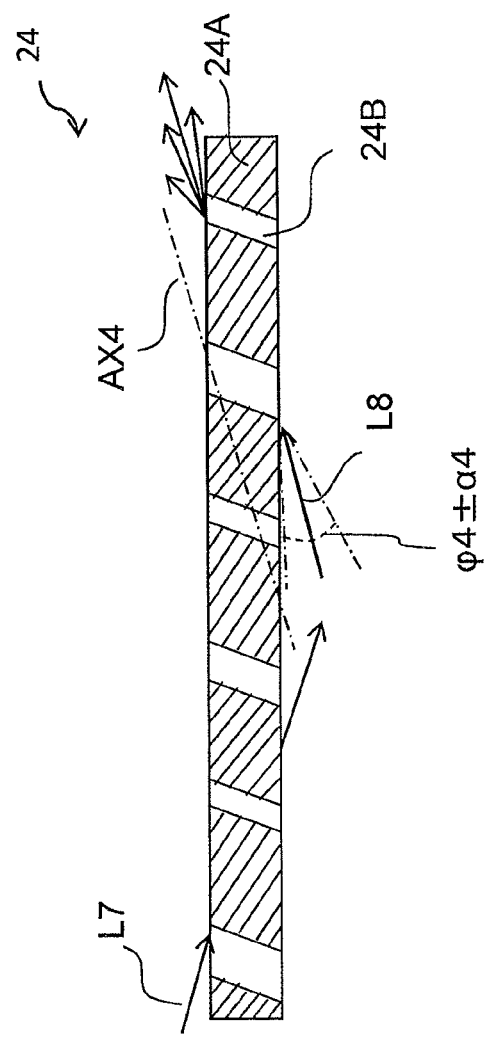
FIG. 18 is a diagram illustrating another example of the configuration and the function of the light-scattering layer for auxiliary light source in FIG. 1.

In the above-described embodiment, for example, as illustrated in FIG. 17, the light-scattering layer 24 for auxiliary light source may be disposed on a side closer to the bottom surfaces of the light-scattering layers 21 to 23 for environmental light. However, in such a case, the light-scattering layer 24 is preferably configured to scatter light when the light exits therefrom. For example, as illustrated in FIG. 18, the light-scattering layer 24 may relatively strongly scatter a light component incident to the light-scattering layer 24 within the second angle range 20C in light incident from the liquid crystal display panel 10, and may relatively weakly scatter a light component incident within an angle range other than the second angle range 20C.

Figure 19:
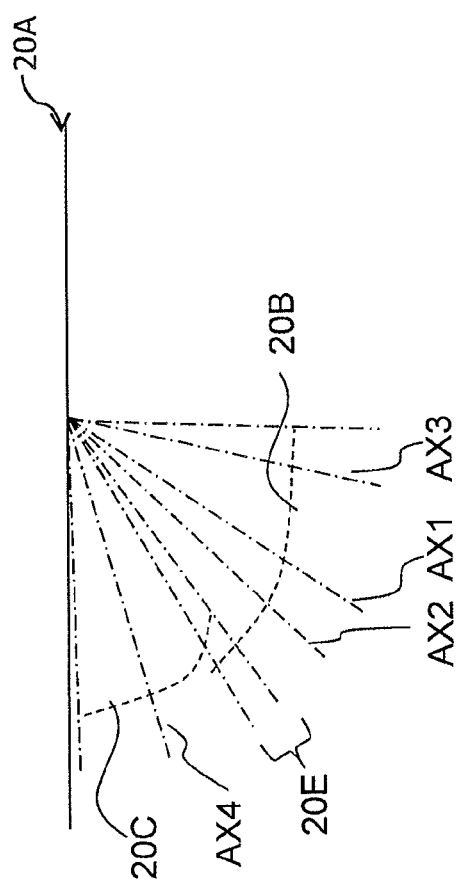
FIG. 19 is a diagram illustrating an example of a relationship between scattering ranges of the respective light-scattering layers in FIG. 18 and FIGS. 3 to 5.

In the present modification, as illustrated in FIGS. 2 to 4, the light-scattering layers 21 to 23 may be configured to scatter light when the light exits therefrom. In this case, as illustrated in FIG. 19 which schematically illustrates scattering characteristics of the light-scattering layers 21 to 24, the first angle range 20B and the second angle range 20C overlap each other in an angle sub-range (the overlap angle range 20E) not including the scattering central axes AX1 to AX3 and AX4. Therefore, while the light-scattering layer 24 effectively scatters light from the auxiliary light source 70, the light-scattering layer 24 exerts little effect on light hardly having a component of the overlap angle range 20E such as environmental light.

Figure 20:
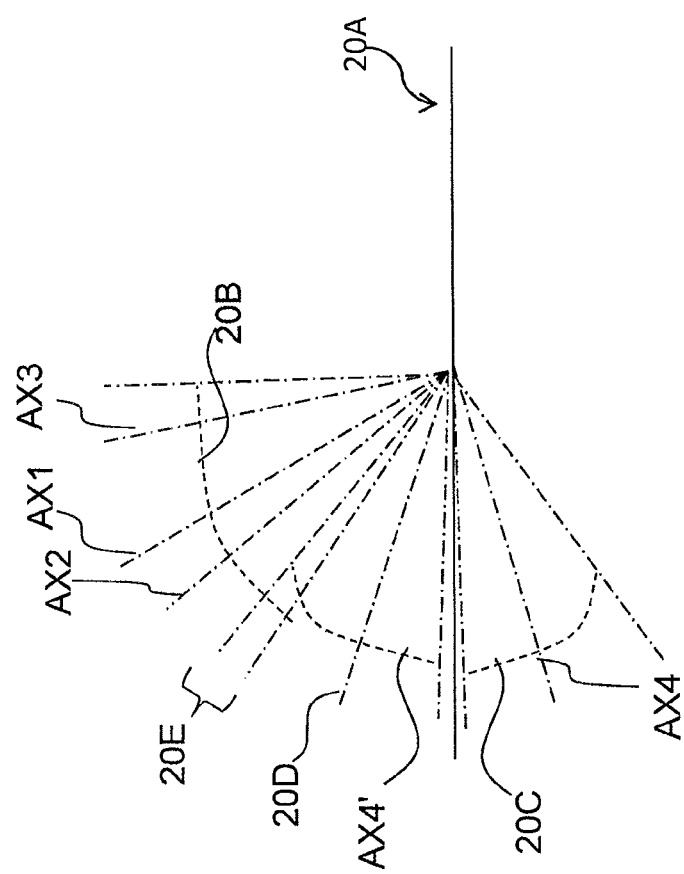
FIG. 20 is a diagram illustrating an example of a relationship between scattering ranges of the respective light-scattering layers in FIGS. 18 and FIGS. 9 to 11.

Moreover, in the present modification, as illustrated in FIGS. 9 to 11, the light-scattering layers 21 to 23 may be configured to scatter light when light is incident thereto. In this case, as illustrated in FIG. 20 which schematically illustrates scattering characteristics of the light-scattering layers 21 to 24, the first angle range 20B and the third angle range 20D also overlap each other in an angle sub-range (the overlap angle range 20E) not including the scattering central axes AX1 to AX3 and AX4. Therefore, while the light-scattering layer 24 effectively scatters light from the auxiliary light source 70, the light-scattering layer 24 exerts little effect on light hardly having a component of the overlap angle range 20E such as environmental light.

3. Application Example

Figure 21:
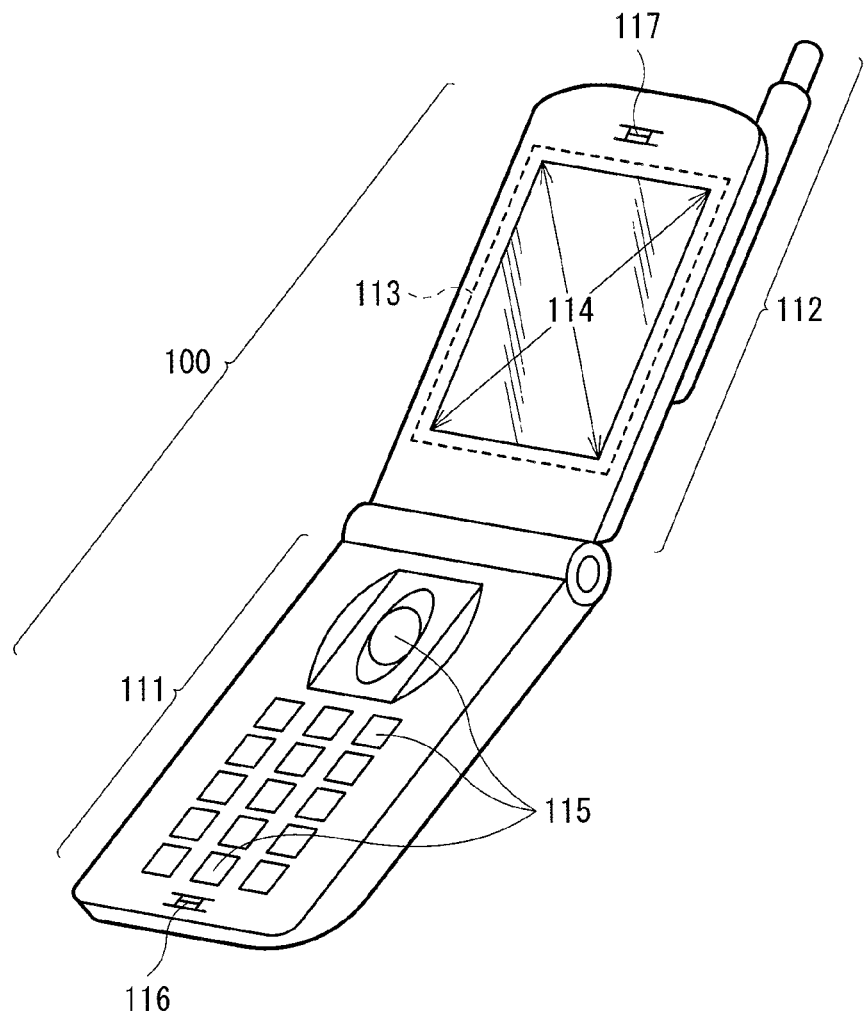
FIG. 21 is a perspective view illustrating an example of a configuration of an electronic unit according to an application example.

Next, an application example of the display 1 according to any of the above-described embodiment and modifications thereof will be described below. FIG. 21 is a perspective view illustrating an example of a schematic configuration of an electronic unit 100 according to the application example. The electronic unit 100 is a cellular phone, and, for example, as illustrated in FIG. 21, the electronic unit 100 includes a main body section 111, and a display body section 112 openable and closable with respect to the main body section 111. The main body section 111 includes operation buttons 115 and a transmitter section 116. The display body section 112 includes a display 113 and a receiver section 117. The display 113 displays various indications for telephone communication on a display screen 114 thereof. The electronic unit 100 includes a control section (not illustrated) to control the operation of the display 113. For example, the control section outputs an image signal to the display 113. The control section is disposed in the main body section 111 or the display body section 112 as a part of a control section controlling the entire electronic unit 100 or a control section different from the control section controlling the entire electronic unit 100.

The display 113 has the same configuration as that of the display 1 according to any of the above-described embodiment and modifications thereof. Therefore, as flexibility in placement of the auxiliary light source 70 is allowed to be provided in the display 113, the electronic unit 100 also has flexibility in design. Moreover, in the electronic unit 100, an input interface such as a touch sensor is allowed to be mounted in the display 1. Further, as the display 1 is used as the display 113, a visually natural image is allowed to be displayed. In the case where, as the display 113, the display 1 in which the angle ψ2 of the scattering central axis AX2 of the light-scattering layer 22 which is smaller than the angles ψ1 and ψ3 of the scattering central axes AX1 and AX3 of the light-scattering layers 21 and 23 is used, a natural image with less image blur is allowed to be displayed. In addition, an image with high white luminance is allowed to be displayed.

It is to be noted that, in addition to the above-described cellular phone, electronic units to which the display 1 according to any of the above-described embodiment and modifications thereof is applicable include a personal computer, a liquid crystal television, a viewfinder type or monitor direct-view type videotape recorder, a car navigation system, a pager, an electronic organizer, an electronic calculator, a word processor, a work station, a videophone, a POS terminal, and the like.

Moreover, the technology is allowed to have the following configurations.

(1) A display including:
a reflective or semi-transmissive display panel;
a light-scattering layer disposed on a top surface of the display panel; and
an auxiliary light source supplying light to the display panel through the light-scattering layer,
in which the light-scattering layer is an anisotropic front scattering layer which relatively strongly scatters light incident from a specific direction within a first angle range and a second angle range and relatively weakly scatters light incident within an angle range other than the first and second angle ranges,
the light-scattering layer has a first scattering central axis corresponding to a first specific angle in the first angle range and a second scattering central axis corresponding to a second specific angle in the second angle range, the first angle range and a third angle range which is an incident-plane symmetrical angle range symmetrical to the second angle range overlap each other in an angle sub-range not including the first specific angle and an incident-plane symmetrical angle symmetrical to the second specific angle, and the auxiliary light source is configured to allow light therefrom incident from a side closer to the auxiliary light source or light therefrom reflected by the display panel to be incident from a side closer to the display panel to mainly enter the light-scattering layer within the second angle range.

(2) The display according to (1), in which
the incident-plane symmetrical angle symmetrical to the second specific angle is larger than the first specific angle.

(3) The display according to (1) or (2), in which
the light-scattering layer includes
a first anisotropic front scattering layer which relatively strongly scatters light incident from a specific direction within the first angle range and relatively weakly scatters light incident within an angle range other than the first angle range, and
a second anisotropic front scattering layer which relatively strongly scatters light incident from a specific direction within the second angle range and relatively weakly scatters light incident within an angle range other than the second angle range.

(4) The display according to (3), in which
the second anisotropic front scattering layer is disposed on a top side of the first anisotropic front scattering layer, and
the auxiliary light source is configured to allow light therefrom incident from the side closer to the auxiliary light source to mainly enter the light-scattering layer within the second angle range.

(5) The display according to (3), in which
the second anisotropic front scattering layer is disposed on a bottom side of the first anisotropic front scattering layer, and
the auxiliary light source is configured to allow light therefrom reflected by the display panel to be incident from the side closer to the display panel to mainly enter the light-scattering layer within the second angle range.

(6) The display according to (3), in which
the first anisotropic front scattering layer is configured of one or a plurality of anisotropic front scattering layers each having a single scattering central axis.

(7) The display according to (3), in which
the first anisotropic front scattering layer includes
a third anisotropic front scattering layer having a plurality of scattering central axes as the first scattering central axis, and
a fourth anisotropic front scattering layer having a single scattering central axis as the first scattering central axis.

(8) The display according to (1) or (2), in which
the light-scattering layer is a single-layer anisotropic front scattering layer.

(9) The display according to any one of (1) to (8), in which
the light-scattering layer relatively strongly scatters a light component incident to the light-scattering layer within the second angle range in light incident from the side closer to the display panel and relatively weakly scatters a light component incident within an angle range other than the second angle range, and relatively strongly scatters a light component incident to the light-scattering layer within the first angle range in light incident from a side opposite to the display panel and relatively weakly scatters a light component incident within an angle range other than the first angle range.

(10) The display according to any one of (1) to (8), in which the light-scattering layer relatively strongly scatters a light component incident to the light-scattering layer within the first angle range in light incident from the side closer to the display panel and relatively weakly scatters a light component incident within an angle range other than the first angle range, and relatively strongly scatters a light component incident to the light-scattering layer within the first angle range in light incident from a side opposite to the display panel and relatively weakly scatters a light component incident within an angle range other than the first angle range.

(11) A display including:
a reflective or semi-transmissive display panel;
a light-scattering layer disposed on a top surface of the display panel; and
an auxiliary light source supplying light to the display panel through the light-scattering layer,
in which the light-scattering layer is an anisotropic front scattering layer which relatively strongly scatters light incident from a specific direction within a first angle range and a second angle range and relatively weakly scatters light incident within an angle range other than the first and second angle ranges,
the light-scattering layer has a first scattering central axis corresponding to a first specific angle in the first angle range and a second scattering central axis corresponding to a second specific angle in the second angle range,
the first angle range and the second angle range overlap each other in an angle sub-range not including the first specific angle and the second specific angle, and
the auxiliary light source is configured to allow light therefrom incident from a side closer to the auxiliary light source or light therefrom reflected by the display panel to be incident from a side closer to the display panel to mainly enter the light-scattering layer within the second angle range.

(12) An electronic unit including a display, the display including:
a reflective or semi-transmissive display panel;
a light-scattering layer disposed on a top surface of the display panel; and
an auxiliary light source supplying light to the display panel through the light-scattering layer,
in which the light-scattering layer is an anisotropic front scattering layer which relatively strongly scatters light incident from a specific direction within a first angle range and a second angle range and relatively weakly scatters light incident within an angle range other than the first and second angle ranges,
the light-scattering layer has a first scattering central axis corresponding to a first specific angle in the first angle range and a second scattering central axis corresponding to a second specific angle in the second angle range,
the first angle range and a third angle range which is an incident-plane symmetrical angle range symmetrical to the second angle range overlap each other in an angle sub-range not including the first specific angle and an incident-plane symmetrical angle symmetrical to the second specific angle, and
the auxiliary light source is configured to allow light therefrom incident from a side closer to the auxiliary light source or light therefrom reflected by the display panel to be incident from a side closer to the display panel to mainly enter the light-scattering layer within the second angle range.

(13) An electronic unit including a display, the display including:
a reflective or semi-transmissive display panel;
a light-scattering layer disposed on a top surface of the display panel; and an auxiliary light source supplying light to the display panel through the light-scattering layer, in which the light-scattering layer is an anisotropic front scattering layer which relatively strongly scatters light incident from a specific direction within a first angle range and a second angle range and relatively weakly scatters light incident within an angle range other than the first and second angle ranges, the light-scattering layer has a first scattering central axis corresponding to a first specific angle in the first angle range and a second scattering central axis corresponding to a second specific angle in the second angle range, the first angle range and the second angle range overlap each other in an angle sub-range not including the first specific angle and the second specific angle, and the auxiliary light source is configured to allow light therefrom incident from a side closer to the auxiliary light source or light therefrom reflected by the display panel to be incident from a side closer to the display panel to mainly enter the light-scattering layer within the second angle range.

The present application contains subject matter related to that disclosed in Japanese Priority Patent Application 2011-177827 filed in the Japan Patent Office on Aug. 16, 2011, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A display comprising:
a reflective or semi-transmissive display panel;
a light-scattering layer disposed on a top surface of the display panel; and
an auxiliary light source supplying light to the display panel through the light-scattering layer,
wherein the light-scattering layer is an anisotropic front scattering layer which relatively strongly scatters light incident from a specific direction within a first angle range and a second angle range and relatively weakly scatters light incident within an angle range other than the first and second angle ranges,
the light-scattering layer has a first scattering central axis corresponding to a first specific angle in the first angle range and a second scattering central axis corresponding to a second specific angle in the second angle range,
the first angle range and a third angle range which is an incident-plane symmetrical angle range symmetrical to the second angle range overlap each other in an angle sub-range not including the first specific angle and an incident-plane symmetrical angle symmetrical to the second specific angle, and
the auxiliary light source is configured to allow light therefrom incident from a side closer to the auxiliary light source or light therefrom reflected by the display panel to be incident from a side closer to the display panel to mainly enter the light-scattering layer within the second angle range.

2. The display according to claim 1, wherein
the incident-plane symmetrical angle symmetrical to the second specific angle is larger than the first specific angle.

3. The display according to claim 1, wherein
the light-scattering layer includes
a first anisotropic front scattering layer which relatively strongly scatters light incident from a specific direction within the first angle range and relatively weakly scatters light incident within an angle range other than the first angle range, and
a second anisotropic front scattering layer which relatively strongly scatters light incident from a specific direction within the second angle range and relatively weakly scatters light incident within an angle range other than the second angle range.

4. The display according to claim 3, wherein
the second anisotropic front scattering layer is disposed on a top side of the first anisotropic front scattering layer, and
the auxiliary light source is configured to allow light therefrom incident from the side closer to the auxiliary light source to mainly enter the light-scattering layer within the second angle range.

5. The display according to claim 3, wherein
the second anisotropic front scattering layer is disposed on a bottom side of the first anisotropic front scattering layer, and
the auxiliary light source is configured to allow light therefrom reflected by the display panel to be incident from the side closer to the display panel to mainly enter the light-scattering layer within the second angle range.

6. The display according to claim 3, wherein
the first anisotropic front scattering layer is configured of one or a plurality of anisotropic front scattering layers each having a single scattering central axis.

7. The display according to claim 3, wherein
the first anisotropic front scattering layer includes
a third anisotropic front scattering layer having a plurality of scattering central axes as the first scattering central axis, and
a fourth anisotropic front scattering layer having a single scattering central axis as the first scattering central axis.

8. The display according to claim 1, wherein
the light-scattering layer is a single-layer anisotropic front scattering layer.

9. The display according to claim 1, wherein
the light-scattering layer relatively strongly scatters a light component incident to the light-scattering layer within the second angle range in light incident from the side closer to the display panel and relatively weakly scatters a light component incident within an angle range other than the second angle range, and relatively strongly scatters a light component incident to the light-scattering layer within the first angle range in light incident from a side opposite to the display panel and relatively weakly scatters a light component incident within an angle range other than the first angle range.

10. The display according to claim 1, wherein
the light-scattering layer relatively strongly scatters a light component incident to the light-scattering layer within the first angle range in light incident from the side closer to the display panel and relatively weakly scatters a light component incident within an angle range other than the first angle range, and relatively strongly scatters a light component incident to the light-scattering layer within the first angle range in light incident from a side opposite to the display panel and relatively weakly scatters a light component incident within an angle range other than the first angle range.

11. A display comprising:
a reflective or semi-transmissive display panel;
a light-scattering layer disposed on a top surface of the display panel; and an auxiliary light source supplying light to the display panel through the light-scattering layer, wherein the light-scattering layer is an anisotropic front scattering layer which relatively strongly scatters light incident from a specific direction within a first angle range and a second angle range and relatively weakly scatters light incident within an angle range other than the first and second angle ranges, the light-scattering layer has a first scattering central axis corresponding to a first specific angle in the first angle range and a second scattering central axis corresponding to a second specific angle in the second angle range, the first angle range and the second angle range overlap each other in an angle sub-range not including the first specific angle and the second specific angle, and the auxiliary light source is configured to allow light therefrom incident from a side closer to the auxiliary light source or light therefrom reflected by the display panel to be incident from a side closer to the display panel to mainly enter the light-scattering layer within the second angle range.

12. An electronic unit including a display, the display comprising:
a reflective or semi-transmissive display panel;
a light-scattering layer disposed on a top surface of the display panel; and
an auxiliary light source supplying light to the display panel through the light-scattering layer,
wherein the light-scattering layer is an anisotropic front scattering layer which relatively strongly scatters light incident from a specific direction within a first angle range and a second angle range and relatively weakly scatters light incident within an angle range other than the first and second angle ranges,
the light-scattering layer has a first scattering central axis corresponding to a first specific angle in the first angle range and a second scattering central axis corresponding to a second specific angle in the second angle range,
the first angle range and a third angle range which is an incident-plane symmetrical angle range symmetrical to the second angle range overlap each other in an angle sub-range not including the first specific angle and an incident-plane symmetrical angle symmetrical to the second specific angle, and
the auxiliary light source is configured to allow light therefrom incident from a side closer to the auxiliary light source or light therefrom reflected by the display panel to be incident from a side closer to the display panel to mainly enter the light-scattering layer within the second angle range.

13. An electronic unit including a display, the display comprising:
a reflective or semi-transmissive display panel;
a light-scattering layer disposed on a top surface of the display panel; and
an auxiliary light source supplying light to the display panel through the light-scattering layer,
wherein the light-scattering layer is an anisotropic front scattering layer which relatively strongly scatters light incident from a specific direction within a first angle range and a second angle range and relatively weakly scatters light incident within an angle range other than the first and second angle ranges,
the light-scattering layer has a first scattering central axis corresponding to a first specific angle in the first angle range and a second scattering central axis corresponding to a second specific angle in the second angle range,
the first angle range and the second angle range overlap each other in an angle sub-range not including the first specific angle and the second specific angle, and
the auxiliary light source is configured to allow light therefrom incident from a side closer to the auxiliary light source or light therefrom reflected by the display panel to be incident from a side closer to the display panel to mainly enter the light-scattering layer within the second angle range.

* * * * *